March 2, 1943. J. LOHSE 2,313,019
METALLURGICAL PROCESS
Original Filed Oct. 15, 1940 2 Sheets-Sheet 1
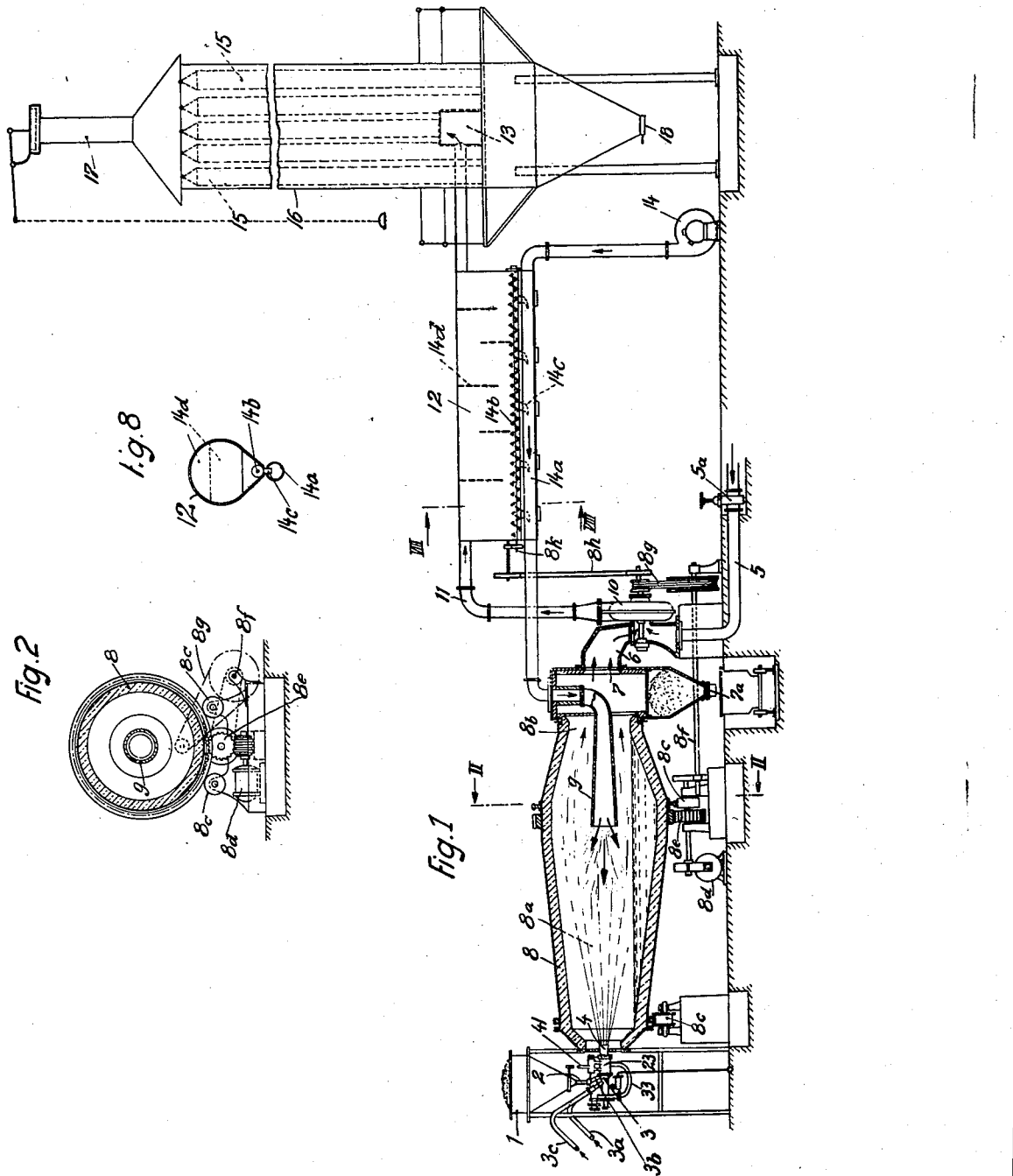
Inventor:
Julius Lohse.
By Watson E. Coleman.
Attorney.

March 2, 1943. J. LOHSE 2,313,019
METALLURGICAL PROCESS
Original Filed Oct. 15, 1940 2 Sheets-Sheet 2
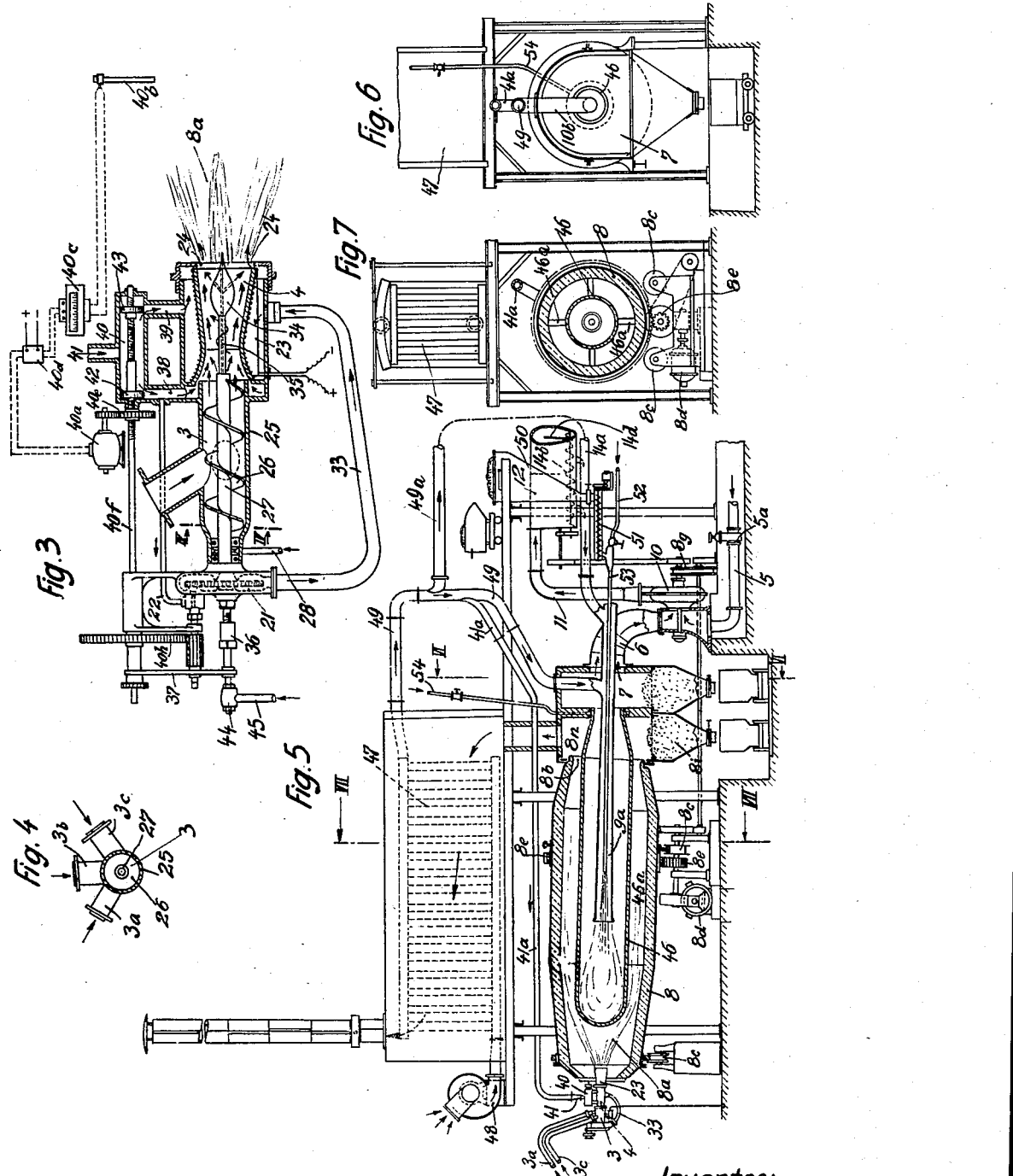
Inventor:
Julius Lohse,
By Watson E. Coleman,
Attorney Patented Mar. 2, 1943

2,313,019

UNITED STATES PATENT OFFICE 2,313,019

METALLURGICAL PROCESS

Julius Lohse, Berlin-Wilmersdorf, Germany; vested in the Alien Property Custodian Original application October 15, 1940, Serial No. 361,314. Divided and this application July 12, 1941, Serial No. 402,252. In Germany September 1, 1937

11 Claims. (Cl. 75—9)

My present application constitutes a division of my co-pending application Serial No. 361,314 filed October 15, 1940, which is a continuation-in-part of my former application Serial No. 227,488 filed August 30, 1938. The invention of my present application relates to a continuous metallurgical process for the dressing of raw materials in a flame chamber, more particularly for the desulphurisation, chlorination, roasting or drying of ores, concentrates or other minerals, and has for its object to provide improvements in processes of this kind, by which there is rendered possible a uniform dressing of the material in one operation, for example in the case of a roasting process even up to the extent of dead roasting, at the same time all manual operations together with any parts conducted through the material during the roasting operation and consequently subjected to considerable wear being avoided. Other advantages reside in the completely automatically regulable nature of the dressing process, which owing to a special returning means provided in accordance with the invention necessitates merely a short body or flame chamber and thus assists considerably to reduce the cost of the plant.

For the desulphurisation and roasting of ores, concentrates or other products containing sulphur it has already been proposed, apart from the roasting processes previously usual in open kilns and stalls, to perform this roasting by hand in reverberatory furnaces of the material-advancing type with direct or indirect heating. It is also known to perform the manual operation by means of rakes suspended on chains, and on the other hand to make the arrangement of the furnaces such that roasting is performed on the different levels of a circular shaft furnace.

In this connection it is also old in the art to disintegrate the ore or other product to be roasted, so that the rakes do not require to work through large lumps of ore but merely through a material ranging in size between a coarse granular and a powdery condition. In this way furrows are formed in the material in the direction of movement of the rakes, which present an increased surface area to the action of the roasting gases, as a result of which, by reason of the movement of the rakes, material not yet roasted is brought into action successively.

The disadvantage of apparatus operating with rakes consists on the one hand in the fact that the rakes are unable to convey the material down to the last grain, within range of the roasting action, so that a complete roasting of the material is only possible by continuous repetition of the roasting process, and even then it is not of a regular kind. On the other hand the disintegrated material under the movement of the rakes, transfers its fine particles of dust to the current of heating gas and over-saturates this current, so that the roasting effect is obstructed.

It is also known, for the purpose of avoiding a dragging movement on the part of the rakes together with the disadvantages associated therewith, to supply the preliminarily disintegrated material to a revolving furnace, which passes the material in slow progressive movement through the flame chamber. To heat a revolving furnace of this kind it has been proposed to provide numerous air, gas and oil nozzles distributed along the length of the furnace, by means of which nozzles the roasting flames can be ignited at different points of the furnace and thus act on the material always with a new roasting effect.

Since within the revolving furnace nozzles of this kind are of necessity covered successively by the material to be roasted and the burning of a roasting flame when covered by the material in direct fashion is not possible, extensive control by means and control pipes are necessary along the complete furnace, which cause the flame to be ignited only at the moment when the nozzle in question is located above the charge. Despite the even movement of the material within the furnace there is nevertheless created in the furnace, as a result of slipping action and the whirling effect of the tuyères and the gas nozzles a dust, which likewise chokes the atmosphere of the furnace, so that the roasting operation is considerably obstructed, whilst moreover in utilising the waste gases extensive dust-filtering means must be provided, from which the incompletely roasted ore dust must be returned to the furnace for additional treatment.

Whilst the furnaces furnished with rakes exhibit a very appreciable wear of the rake arms and the rakes themselves, and the replacement of these cast iron parts is not only health-impairing and costly but also requires a certain amount of time, the revolving furnaces of the kind referred to, owing to the flames conducted radially in the interior thereof, also exhibit considerable wear of the brickwork and corrosion of the nozzles, which at times are covered by material and at times are exposed in the flame chamber. Repairing of the brickwork is a very complicated matter, even in the case of a single furnace, as the brickwork consists not merely of simple radial bricks but expensive shaped bricks of many different forms.

My present invention is based on the idea of employing as a carrier for the entire roasting operation the flame in conjunction with the ore dust which hitherto was considered during desulphurisation and roasting as a great evil, but which according to my method is introduced in such a way into the flame, and preferably into the whirling flame in one embodiment and into the hottest region of roasting chamber in another embodiment, that the large surfaces of the dust particles are continuously acted upon by the roasting agent. The problem with which the invention is primarily concerned consists in maintaining the dust and other ore particles during the roasting operation in intimate contact with the roasting agent and the solution to the problem resides in injecting the mixture for roasting into a hot chamber, preferably by charging them on to a whirling flame, whilst maintaining the current of roasting gas under pressure and performing the complete roasting operation in this hot current.

According to my invention, the ore, in a finely divided condition, is injected in common with the roasting agent under pressure into a hot chamber, floating in the current of roasting gas, and is again sucked off from this chamber whilst the current is maintained.

My invention can be carried into effect in two ways of which one is a modification of the other; common to both is the fact that the roasting action is effected over a considerably extended heated area. The ore is, for instance, injected in common with the roasting and firing agent into a furnace in a whirling flame distented to form a hollow cone, and is again sucked up from the furnace, or the ore is injected in common with the roasting agent into an elongated externally heated retort and then also sucked off.

In the first case it is also proposed to obtain an increase in the roasting area by a blast containing oxygen which is blown in opposition on the whirling flame carrying particles of ore to be roasted, in such a manner that the flame is distended in corona-like fashion to form a hollow cone. In this way the roasting action is rapidly accomplished.

The fundamental idea of my invention resides not only in carrying out the roasting operation within an oxydizing flame zone, but also, owing to the large surface of the particles of dust and the favorable liberation of the affinitive forces of the roasting gases in relation to the material to be roasted, in making the roasting more spontaneous than has ever been possible heretofore in a flame chamber.

Additional to the above my invention also makes provision for the fact that, if necessary, the gases sucked up from the furnace and bearing the particles of ore floating therein are again mixed with fresh air and introduced into the furnace anew. In the first case the return of the sucked up gases takes place in opposition to and in manner so as to distend the primary flame, whereas in the making use of an elongated, indirectly heated retort the sucked up particles are again conducted to the same inlet aperture through which they were originally admitted.

Owing to the distension of the roasting flame in the flame chamber and by reason of the fresh air added, the hot particles of ore give off within the flame in addition to their own heat, that of the sulphur or other additions included therein and thus exert an extremely favourably influence on the thermal economy of the complete treatment.

Owing to the method according to my invention of performing roasting in the hot current of a roasting flame and also by reason of the possibility of repeating the roasting operation one or more times in this current, it is possible to roast down the sulphur to small percentages, even to the extent of dead roasting, which result has not been attained with the apparatus previously in use.

According to my invention it is also proposed, after completion of the roasting operation, to conduct the current of gas with the particles of dust to a filtering device, whilst the large pieces precipitated in the furnace as a result of agglomerating are conducted by the rotary movement of the furnace into a collection hopper.

In addition to the stated advantages consisting in an increased roasting effect and the possibility of performing roasting even up to the extent of dead roasting the revolving furnace according to my invention is subject to much less wear than the apparatus previously in use, as the flame impinges on the brickwork of the furnace not radially but at a tangent and also in whirling form, and a variation in temperature caused by the rotary movement with respect to those parts of the furnace, situated at one time above the charge in the flame chamber and at another time in cooling fashion beneath the charge, does not take place. There is also the advantage that the furnace can be bricked with simple radial bricks, the production of which is simpler and cheaper than that of shaped bricks. The total cost of a plant of the nature is accordingly very much less.

An additional advantage can be obtained according to my invention by providing the furnace with a regulable burner, which can be adjusted completely automatically by the use of known regulating means. By the use of a completely automatic device of this nature the roasting operation can be carried out independently of the skill of the man in charge, so that a certain roasting process having a certain roasting action can be adjusted once and for all solely on the bases of tests carried out in the laboratory.

My invention is illustrated by way of example in the accompanying drawings, in which:

Fig. 1 shows diagrammatically in elevation and in partial section a plant in which roasting is performed in an open flame current.

Fig. 2 is a sectional view on the line II—II in Fig. 1.

Fig. 3 is a partly sectional view on a larger scale of the burner shown in Fig. 1 diagrammatically.

Fig. 4 is a section on the line IV—IV in Fig. 3 showing more clearly the distribution of the intake pipes of the burner.

Fig. 5 shows diagrammatically in elevation and partly in section a plant in which the roasting takes place within an elongated indirectly heated retort.

Fig. 6 is a sectional view on the line VI—VI in Fig. 5.

Fig. 7 is a sectional view along the line VII—VII in Fig. 5, and

Fig. 8 is a sectional view along the line VIII—VIII in Fig. 1.

In Fig. 1 the material is introduced together with the requisite coal into the hopper 1 in a disintegrated condition approximately equivalent to a screen mesh of 20–40. The ground material is blown through the pipe 2 to a worm in the burner 3. In the burner nozzle 4 there is an intimate mixing of the materials employed, for example oil, gas, coal and sulphide ores with secondary and primary air, with simultaneous agitation, so that after ignition of the flame the latter whirls in the form of a long conical flame 8a in the bricked conical jacket 8 of the furnace.

The burner structure comprises an air chamber 23 which encloses the nozzle structure 4 and opens at its forward end into the furnace 8, around the nozzle 4 at 24. Extending through the rear end of the air chamber and into the rear of the nozzle 4 is a screw conveyor tube 25 in which is a screw conveyor 26 supported upon a tubular shaft 27. Into the screw conveyor there open the three inlets 3b, 3a and 3c, the inlet 3b receiving the pulverized ore while gas and coal dust are fed into the conveyor tube 25 by way of the inlets 3a and 3c respectively.

Fuel oil under pressure is fed through the pipe 28 to a suitable feed ring 29 surrounding the rear end of the tubular screw conveyor shaft 27 from which ring the fuel passes into the tubular shaft by way of apertures not especially marked. This fuel is discharged at the forward end of the shaft in the burner nozzle 4 where it mixes with the gas, powdered coal and minerals to be blown into the furnace.

The rear end of the screw shaft is connected with a rotor 21 which is driven by compressed air supplied through the pipe line 22 through a suitable nozzle against blades forming a part of the rotor 21, and by this means the screw is turned to feed the several materials to the burner. The air employed for driving the rotor 21 passes out of the rotor casing into the pipe line 33 and is discharged in the air chamber 23, as shown.

Disposed within the forward end of the burner nozzle 4 is a needle 34 which is adjustable in the opening of the burner nozzle 4 to regulate the size of the same, and this needle is supported upon a stem 35 which passes through the tubular shaft 27 and through the rotor 21 where it is threadably connected in a suitable supporting nut 36 so that upon being turned as by means of a control belt 37 which encircles the rear end of this stem 35, it may be fed forwardly or retracted in the burner nozzle if desired.

The numerals 38 and 39 designate air feed channels which lead from a compressed air chest 40 respectively to the rear end of the burner nozzle 4 and the air chamber 23. The numeral 41 designates the air inlet for the air chest. The aforementioned air pipe 22 is branched off the channel 38. Within the air chest 40 are valves 42 and 43 which are under the control of suitable automatic regulating mechanism for governing the flow of air through the feed channels 38 and 39. Such regulating mechanism comprising, for instance, a pair of gear wheels 40e and a motor 40a controlled from a pyrometer 40b arranged within the chamber wall 8, with indicator 40c, over an impulse producer 40d, and may incidentally be used for also regulating in accordance with the air admission into the nozzle 4, the air admission to the rotor 21, by means of an extended shaft 40f and a gearing 40h, and the position of a needle 34 by actuating the belt 37, whereby the stem 35 is advanced or retracted.

The stem 35 carrying the needle 34 is tubular and means is provided, as indicated at 44, for carrying thereinto through a pipe line 45 connected with a suitable source of supply, any gases which it may be found desirable to introduce such as oxidising or chlorinating gases.

At the opposition end of the furnace there is a discharge section 8b, into which projects a refractory blast pipe 9 extending approximately to the base of the two cones of the double-conical revolving furnace 8.

This blast pipe has compressed fresh air supplied to the same by the fan 14 through pipe 14a. Another fan 10 is connected, by means of pipe 6, centrally to a chamber 7, into which the discharge section 8b of the rotating furnace 8 projects and out of which the fan 10 sucks the sulphurous acid-gas formed during the roasting action, and a part of the furnace gas laden with particles of ore which are returned and injected through the pipe 9 into the flame corona (funnel) to be again subjected to the hottest region of the spontaneous preliminary treatment in a long whirling flame. At 7a lumps, cakes and coarser particles can be discharged into trucks, the material in the discharge funnel of chamber 7 always forming an airtight and gastight seal. The recycling of the ore particles withdrawn by means of fan 10 is performed by a special apparatus, comprising a pipe 11 and an oval shaped chamber 12 (Fig. 8), provided with filter curtains 14d which cause the coarser particles to settle above the bottom where a conveyor 14b moves them into a series of discharge pipes 14c projecting into the above mentioned blast pipe 14a. The air blast therein set up by the fan 14 returns the discharged coarse and fine ore particles into pipe 9, as described. The revolving movement of the conveyor screw 14b is derived from the shaft of the fan 10 over a belting 8h and speed lowering gear 8k. The chamber 12 precedes a filtering tower 16 which may be of any approved construction and is provided at its lower end with a centrifugal device or a fine bronze jacket screen 13 through which the fan 10 forces the current of sulphurous acid-gas and air through bag filter 15. The bronze screen retains the coarser material and accumulates it in a lower funnel portion of the tower 16 along with the dust falling from the bags, which bags can be subjected to a mechanical shaking operation to assist the separation of the dust.

The filtering gas can be sucked up at its lower end by an exhauster for treatment in a sulphuric acid plant not shown. The tower 16, in which the filter bags 15 are suspended, possesses above the bags a comparatively large empty space which during the operation is filled with the combustion gases, which are lighter than sulphur dioxide and sulphor trioxide, so that nitrogen, carbon monoxide or carbon dioxide are able to escape into the air through a pipe 17. This arrangement within the tower 16 permits of a preliminary separation of the flue gases, as carbon monoxide with a specific weight of 0.967, nitrogen with a specific weight of 0.971 and carbon dioxide with a specific weight of 1.525 will always be displaced upwards in relation to sulphur dioxide and sulphur trioxide having specific weights of 2.214 and 2.765 respectively. At 18 the finest material such as copper, iron oxide, ferro oxide, zinc oxide, etc., is preferably sucked off with preclusion of the air and discharged for example into trucks.

It is shown in Fig. 1 that the chamber 8 rotates upon rollers 8c (Fig. 2). The movement is derived from a motor 8d over gearing 8e. This motor also actuates, over a shaft 8f and a belting 8g, the fan 10.

The embodiment according to Figs. 5 to 7 shows in what manner a tubular retort 46 may be used, which is preferably furnished with thin walls and is supported within the furnace upon radial walls 46a, so as to revolve with the furnace. The retort 46 is heated within the latter externally by the flame 8a of the burner 3, 4. In this embodiment no mineral ores are fed into the burner nozzle 4 but merely air, coal and fuel oil, therefore, when operating the apparatus as illustrated in Fig. 5 the inlet 3b (Fig. 4) will be closed.

The waste gases of the flame 8a are preferably utilised by the provision of a heat exchange device 47, into which the waste gases pass from the chamber 8h through a connection indicated, whereas at the opposite end by means of a special blower 48 air is passed through and preheated in 47 and then introduced through a pipe 49 and by way of a pipe 9a into the retort 46 as hot oxidizing air. This pipe 9a, as in the structure shown in Fig. 1 the pipe 9, extends longitudinally into the furnace chamber, but in this case it is enclosed in the retort 46 to conduct into the retort the ore mixture which is supplied from a suitable hopper 50, by a mechanical conveyor 51, into the pipe 53, from which it is discharged into the blast pipe 9a and the retort 46 by an air blast provided through a pipe 52. Here the ore material, flying upon the bottom of the revolving retort, is heated to the desired degree by the burning gases within the furnace chamber 8. The roasting gases with the particles of ore floating therein are sucked up continuously by the blower 10, as explained in connection with Fig. 1, following which they pass through pipe 11 into the chamber 12 where the dust and coarser particles are separated and returned into the retort 46 by means of pipe 14a into which, in this case, hot air is blown, as a moving agent which hot air derived, through the branch pipe 49a, from pipe 49 of the air heating device 47. From the retort 46 the residues, primarily metal oxides, are discharged continuously into the chamber 7 and from there into a truck as indicated. As the furnace 8 and the retort 46 are arranged with an inclination of approximately 3–5% in relation to the horizontal, the discharge is facilitated thereby. To prevent the entrance of furnace gases through the narrow slit encircling the neck of the revolving retort 46 within the wall partitioning the chamber 7 from the interior space of the furnace 8, air under pressure is blown into the said slit from a suitable source through pipe 54, thus sealing the slit.

The hot air issuing from the heat-exchange device 47, may also be utilized for the supply of hot air to the burner 3, 4 through the pipe 41a into its air inlet 41.

My invention as employed for carrying out the chemical-thermal treatment for desulphurisation purposes may also be used for performing other chemical-thermal conversion processes, within the bounds of protection secured by the following claims.

What I claim as new and desire to secure by Letters Patent:

1. The process of treating raw ores which comprises injecting such ores longitudinally into an elongated roasting chamber, subjecting the injected ores in the chamber to the action of a roasting flame, working off from one end of the chamber heavier roasted ore particles, sucking off longitudinally from an end of the chamber gases and gas-borne ore particles, subjecting the said gases to the action of a separator to remove the heavier gas-borne ore particles, extracting said heavier particles from the separator by a suction air stream carrying oxidizing gas, and injecting the said heavier particles borne in said air stream into the chamber along the longitudinal centre thereof and at approximately the transverse centre of the same to be acted upon by the roasting flame.

2. The process for the continuous roasting of ores in a rotary furnace for the purpose described, which comprises, injecting the ore into the furnace in pulverized form under high pressure and mixed with coal dust and a combustible fluid, to form in the furnace a long rotating flame in which the ore particles are suspended, whereby such particles are rapidly heated and oxidized, sucking off from the furnace gases and solid particles, subjecting the said gases to the action of a separator to effect removal of the heavier gas-borne ore particles, collecting said heavier particles in a receiver, extracting said heavier particles from the receiver by a suction air stream carying oxidizing gas and injecting the air stream and the heavier particles borne thereby against the end of and into the flame under such pressure that thereby the flame is distended and a central oxidizing cone is formed therein in which the re-injected ore particles are further treated.

3. The metallurgical process for the continuous treatment of raw ore materials in a flame chamber, which consists in injecting the material in finely divided condition under pressure together with reacting agents longitudinally and centrally into an elongated heating chamber floating in a flame, sucking off gas suspended solid particles of material and gases, and re-injecting said suspended material with oxidizing gas longitudinally into the chamber and centrally of the roasting zone.

4. The process of treating raw ores, which comprises injecting such ores in finely divided condition longitudinally into an elongated horizontally disposed roasting chamber, subjecting the ores in the chamber to a roasting heat enveloping the chamber, continuously withdrawing dust and heavier particles of ore from an end of the chamber while simultaneously removing the roasted ore from the said end, subjecting the dust and heavier ore particles to a separatory action outside of the chamber, and re-injecting the separated ore particles with oxidizing gas into the chamber into the portion of maximum temperature for reroasting.

5. The process of treating raw ores, which comprises injecting such ores in finely divided condition longitudinally into an elongated, horizontally disposed roasting chamber, directing a roasting flame against the end of the roasting chamber toward which the injected ores are directed and passing the roasting flame longitudinally of and around the chamber toward the opposite end thereof, rotating said chamber to effect continuous removal of heavier portions of the roasted ores therefrom through the said opposite end, drawing off through the said opposite end gases and ore particles carried thereby, and re-injecting into the chamber toward the first mentioned end the gas-borne particles, together with oxidizing gases, for reroasting.

6. The process as set forth in claim 5 with the added step of mixing heated air with the returned gas-borne particles in advance of the discharge of such particles into the chamber.

7. The process of treating raw ores, which comprises injecting such ores in finely divided condition longitudinally into an elongated roasting chamber toward one closed end thereof, directing a roasting flame against the said closed end of the chamber and carrying the flame longitudinally of the chamber in enveloping relation therewith, sucking off gases and gas-borne ore particles from the other end of the chamber, effecting the separation of the gases and gas-borne particles and collecting such particles in a receiver, extracting the particles from said receiver by an air stream flowing under pressure and carrying the air stream and particles along a confined passageway into the central part of said chamber for discharge thereinto toward the first mentioned end of the chamber, and effecting the heating of said air stream by the products of combustion from said roasting flame.

8. The process as set forth in claim 7 with the added step of introducing a portion of said heated air stream into said passageway just prior to the entrance of the air stream carried particles into the chamber for raising the temperature of said particles.

9. The process as set forth in claim 7 with the added step of carrying the finely divided initially introduced ores through the center of said passageway to effect the preliminary heating of the ores by the heated air stream.

10. The process of treating raw ores, which comprises providing an elongated substantially horizontally disposed retort closed at one end and open at the other end, enclosing said retort in a heating chamber, directing a roasting flame toward and against the closed end of the retort in the chamber and carrying said flame through the chamber lengthwise of and in enveloping relation with the retort, introducing into the retort at substantially the transverse center thereof finely divided ore and directing the ore toward the closed end of the retort and enveloping the introduced ore stream in a stream of heated oxidizing air.

11. The method as set forth in claim 10 with the step of withdrawing gases and gas-borne particles from the open end of the retort and reintroducing such particles into the retort in said heated air stream.

JULIUS LOHSE.